United States Patent
Razoumov et al.

(10) Patent No.: US 6,675,347 B1
(45) Date of Patent: Jan. 6, 2004

(54) METHOD AND APPARATUS FOR COMBINED PUNCTURING AND REPEATING OF CODE SYMBOLS IN A COMMUNICATIONS SYSTEM

(75) Inventors: Leonid Razoumov, San Diego, CA (US); Fuyun Ling, San Diego, CA (US); Stein Lundby, San Diego, CA (US)

(73) Assignee: Qualcomm, Incorporated

( * ) Notice: Subject to any disclaimer, the term of this patent is extended or adjusted under 35 U.S.C. 154(b) by 386 days.

(21) Appl. No.: 09/618,952

(22) Filed: Jul. 19, 2000

(51) Int. Cl.$^7$ .............................................. H03M 13/03
(52) U.S. Cl. ...................... 714/790; 375/141; 375/259; 370/335
(58) Field of Search ........................... 714/790; 375/259

(56) References Cited

U.S. PATENT DOCUMENTS

| | | | | |
|---|---|---|---|---|
| 4,024,508 A | * | 5/1977 | Bachman et al. ......... | 340/172.5 |
| 4,901,307 A | | 2/1990 | Gilhousen et al. ......... | 370/320 |
| 5,103,459 A | | 4/1992 | Gilhousen et al. ......... | 370/206 |
| 6,084,917 A | * | 7/2000 | Kao et al. .................... | 375/260 |
| 6,332,005 B1 | * | 12/2001 | Pehkonen .................... | 375/259 |
| 6,400,703 B1 | * | 6/2002 | Park et al. ................... | 370/342 |

FOREIGN PATENT DOCUMENTS

| | | | |
|---|---|---|---|
| WO | WO 00/21234 | * | 4/2000 |
| WO | WO0147124 | | 6/2001 |
| WO | WO0193431 | | 12/2001 |
| WO | WO0195500 | | 12/2001 |

OTHER PUBLICATIONS

Patent Application No. 08/963,386 entitled "Method and Apparatus for High Rate Packet Data Transmission," filed Nov. 3, 1997, now pending. Paul E. Bender et al., QUALCOMM Incorporated, San Diego, California (USA).

* cited by examiner

Primary Examiner—Christine T. Tu
Assistant Examiner—Dipakkumar Gandhi
(74) Attorney, Agent, or Firm—Philip R. Wadsworth; Kent D. Baker; Albert J. Harnois

(57) ABSTRACT

Techniques for puncturing symbols in a communications system are disclosed. S symbols are received for a frame having a capacity of N symbols, with S being greater than N. P symbols need to be punctured so that remaining symbols fit into the frame. A number of puncture distances, D1 through DN, are computed based on S and P. A particular number of symbol punctures is determined for each computed puncture distance. P1 through PN symbol punctures are then performed at the distances of D1 through DN, respectively. For a more even distribution of the symbol punctures, each of the distances D1 through DN can be selected to be greater than or equal to a minimum puncture distance Dmin defined as Dmin=$\lfloor S/P \rfloor$, where $\lfloor \ \rfloor$ denotes a floor operator. The symbol punctures at each computed distance can be performed together or distributed with symbol punctures at other distances. In the alternative, an accumulator is configured to wrap around after it has been incremented to a value of S, each increment being of size P. A symbol index is incremented by one each time the accumulator is incremented by P, until the symbol index exceeds the value S. The process is advantageously begun with a puncture. Each time the accumulator wraps around, another puncture is performed. As another alternative, puncturing can be combined with symbol repetition.

5 Claims, 9 Drawing Sheets

METHOD AND APPARATUS FOR COMBINED PUNCTURING AND REPEATING OF CODE SYMBOLS IN A COMMUNICATIONS SYSTEM

BACKGROUND

I. Field

The present invention pertains to communications, and more particularly to a method and apparatus for combined puncturing and repeating of code symbols in a communications system.

II. Background

In a typical digital communications system, data is processed, modulated, and conditioned at a transmitter unit to generate a modulated signal that is then transmitted to one or more receiver units. The data processing may include, for example, formatting the data into a particular frame format, encoding the formatted data with a particular coding scheme to provide error detection and/or correction at the receiver unit, puncturing (i.e., deleting) some of the code symbols to fit within a particular frame size, channelizing (i.e., covering) the encoded data, and spreading the channelized data over the system bandwidth. The data processing is typically defined by the system or standard being implemented.

At the receiver unit, the transmitted signal is received, conditioned, demodulated, and digitally processed to recover the transmitted data. The processing at the receiver unit is complementary to that performed at the transmitter unit and may include, for example, despreading the received samples, decovering the despread samples, inserting "erasures" in place of punctured symbols, and decoding the symbols to recover the transmitted data.

A digital communications system typically employs a convolutional code or a Turbo code to provide error correction capability at the receiver unit. The ability to correct transmission errors enhances the reliability of a data transmission. Conventionally, convolutional and Turbo coding is performed using a particular polynomial generator matrix that generates a particular number of code symbols (e.g., 2, 3, or more code symbols) for each input data bit. For example, a rate 1/2 encoder generates two code symbols for each data bit.

A multiple access communications system typically transmits data in frames or packets of predetermined sizes to allow for efficient sharing of system resources among active users. For example, some communications systems support frame sizes that are multiple times a basic frame size (e.g., 768·K bits, where K=1, 2, . . . ). For efficiency, some communications systems also support multiple data rates. Depending on a number of factors, a variable number of data bits (i.e., X) may be provided to the encoder, which then generates a corresponding number of code symbols (e.g., 2X).

In certain instances, the number of code symbols generated is not exactly equal to the capacity of the frame. Symbol repetition and puncturing are then used to fit the generated code symbols into a frame of a particular size. For example, if the number of code symbols is less than the frame capacity, some or all of the code symbols may be repeated (i.e., duplicated) a particular number of times. Conversely or additionally after the symbol repetition, if the number of code symbols is greater than the frame capacity, some of the code symbols may be deleted (i.e., punctured).

One conventional method for puncturing code symbols is to systematically puncture one symbol out of every $D^{th}$ symbols until the required number of symbol punctures is achieved. The remaining symbols are then sent unmodified. In certain situations, this method can puncture symbols unevenly throughout an entire frame, which results in more symbols being punctured in one portion of the frame and less or no symbols being punctured in some other portion of the frame. When symbols are unevenly punctured, performance may be compromised.

As can be seen, techniques that can be used to puncture symbols in a manner to provide improved performance are highly desirable. Thus, there is a need for an improved technique for symbol puncturing and repetition.

SUMMARY

The presently disclosed method and apparatus are directed to an improved technique for symbol puncturing and repetition. Accordingly, in one aspect of the invention, a method for combined repeating and puncturing of symbols in a communications system is provided. The method advantageously includes (a) receiving a first number of symbols L to be fitted into a frame having a capacity of N symbols; (b) initializing to zero an accumulator value and a symbol index value; (c) if the accumulator value is less than N, increasing the accumulator value by L and repeating in the frame a symbol from a location in the first number of symbols corresponding to the symbol index value, the increasing and repeating being performed until the accumulator value is not less than N; (d) if the accumulator value is greater than or equal to N, increasing the symbol index value by one and decreasing the accumulator value by N; and (e) repeating (c)–(d) until the symbol index value is greater than or equal to L.

DETAILED DESCRIPTION OF EMBODIMENTS

Figure 1:
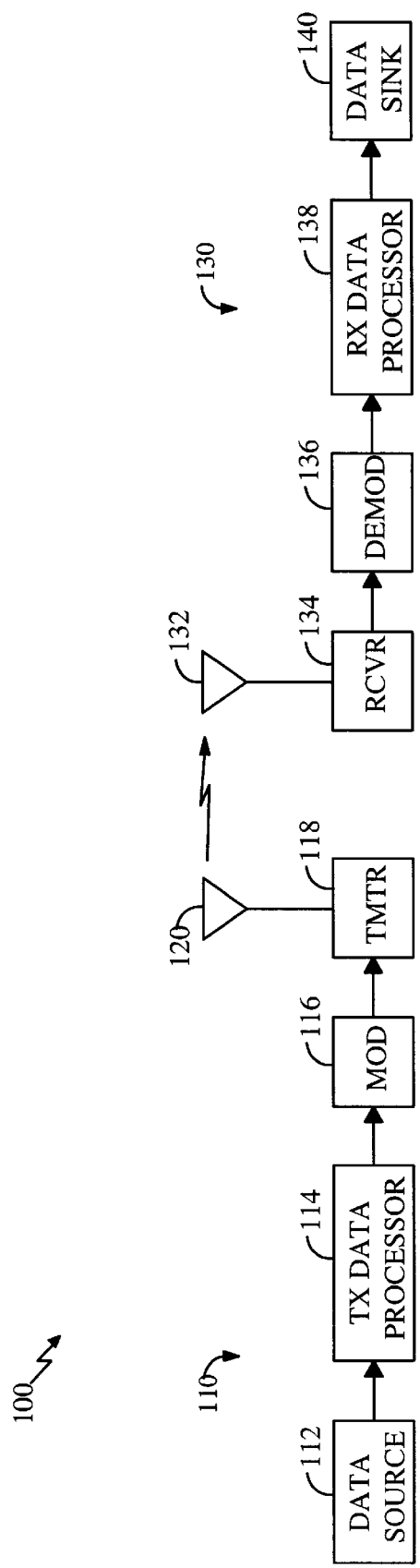
FIG. 1 is a simplified block diagram of a communications system.

FIG. 1 is a simplified block diagram of an embodiment of a communications system 100. At a transmitter unit 110, traffic data is sent, typically in frames or packets, from a data source 112 to a transmit (TX) data processor 114 that formats, encodes, and interleaves (i.e., reorders) the data in accordance with a particular processing scheme. TX data processor 114 typically further processes signal and control data (e.g., pilot and power control data). A modulator (MOD) 116 then receives, channelizes (i.e., covers), and spreads the processed data to generate symbols that are then converted to analog signals. The analog signals are filtered, quadrature modulated, amplified, and upconverted by a transmitter (TMTR) 118 to generate a modulated signal, which is then transmitted via an antenna 120 to one or more receiver units.

At a receiver unit 130, the transmitted signal is received by an antenna 132 and provided to a receiver (RCVR) 134. Within receiver 134, the received signal is amplified, filtered, downconverted, quadrature demodulated, and digitized to provide data samples. The samples are despread, decovered, and demodulated by a demodulator (DEMOD) 136 to generate demodulated symbols. A receive (RX) data processor 138 then reorders and decodes the demodulated symbols to recover the transmitted data. The processing performed by demodulator 136 and RX data processor 138 is complementary to the processing performed at transmitter unit 110. The recovered data is then provided to a data sink 140.

The signal processing described above supports transmissions of voice, video, packet data, messaging, and other types of communication in one direction. A bi-directional communications system supports two-way data transmission. However, the signal processing for the other direction is not shown in FIG. 1 for simplicity.

Communications system 100 can be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link.

The use of CDMA techniques in a multiple access communications system is described in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING SIGNAL WAVEFORMS IN A CDMA CELLULAR TELEPHONE SYSTEM". Another specific CDMA system is disclosed in U.S. patent application Ser. No. 08/963,386, entitled "METHOD AND APPARATUS FOR HIGH RATE PACKET DATA TRANSMISSION," filed Nov. 3, 1997 (hereinafter referred to as the HDR system). These patents and the patent application are assigned to the assignee of the present invention and fully incorporated herein by reference.

CDMA systems are typically designed to conform to one or more standards such as the "TIA/EIA/IS-95-A Mobile Station-Base Station Compatibility Standard for Dual-Mode Wideband Spread Spectrum Cellular System" (hereinafter referred to as the IS-95-A standard), the "TIA/EIA/IS-98 Recommended Minimum Standard for Dual-Mode Wideband Spread Spectrum Cellular Mobile Station" (hereinafter referred to as the IS-98 standard), the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (hereinafter referred to as the W-CDMA standard), and the "TR-45.5 Physical Layer Standard for cdma2000 Spread Spectrum Systems" (hereinafter referred to as the CDMA-2000 standard). New CDMA standards are continually proposed and adopted for use. These CDMA standards are incorporated herein by reference.

Figure 2:
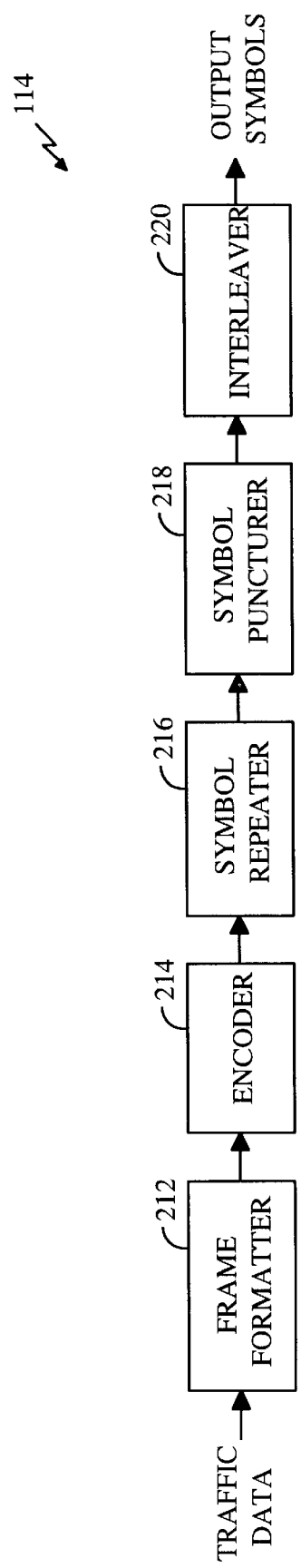
FIG. 2 is a block diagram of a transmit data processor that can be designed to implement various embodiments.

FIG. 2 is a block diagram of an embodiment of TX data processor 114, which can be designed to implement various embodiments. Traffic data is received (again, typically in frames or packets) by a frame formatter 212 that formats each received frame in a particular manner. For example, frame formatter 212 can perform cycle redundancy check (CRC) coding on each frame of data and append the CRC bits to the frame. Frame formatter 212 typically further adds a number of code-tail bits to the end of each frame. The code-tail bits typically have values of zero and are used to set the subsequent encoder to a known state (e.g., all zeros) after the frame has been coded. Other frame formatting functions may also be performed by frame formatter 212.

The formatted frames are then provided to an encoder 214 that codes each frame with a particular coding scheme to generate a corresponding frame of code symbols. For example, encoder 214 may perform convolutional or Turbo coding of a data frame. The particular coding scheme used is dependent on the particular system or standard being implemented and may be selectable (e.g., different coding schemes may be used for different types of services). The coding schemes used for the CDMA-2000 and W-CDMA systems are described in detail in the aforementioned standard documents.

The coded frames are then provided to a symbol repeater 216. Depending on the number of code symbols generated for a particular frame and the capacity of the frame, zero or more symbols may be repeated. For example, in accordance with the CDMA-2000 standard, each symbol in a particular frame is repeated an integer number of time (i.e., M=1, 2, 3, and so on), with the integer number M being selected such that the number of symbols after repetition minimally exceeds the capacity of the frame. Thus, if L code symbols are generated by encoder 214 for a particular frame and the frame has a capacity of N symbols (where $N \geq L$), then each symbol in the frame is repeated M times, where M is computed as $M=\lceil N/L \rceil$. The symbol "$\lceil \; \rceil$" represents a ceiling operator, which provides the next greater integer. For example, if N/L=5.2, then $\lceil N/L \rceil$=6.

In many instances, the number of code symbols after repetition is not equal to the frame size (i.e., the number of code symbols exceeds the capacity of the frame). When this occurs, some of the code symbols are deleted (i.e., punctured) so that the resultant number of code symbols matches the capacity of the frame. Symbol repetition and puncturing are described in further detail below.

The punctured frames are then provided to an interleaver 220. The code symbols for each frame are typically written to interleaver 220 in a particular write order (e.g., sequentially) and, after an entire frame has been stored, the code symbols are retrieved in a particular read order that is typically different from the write order to achieve the reordering of the symbols. Again, the interleaving scheme is typically defined by the particular system or standard being implemented.

Figure 3A:
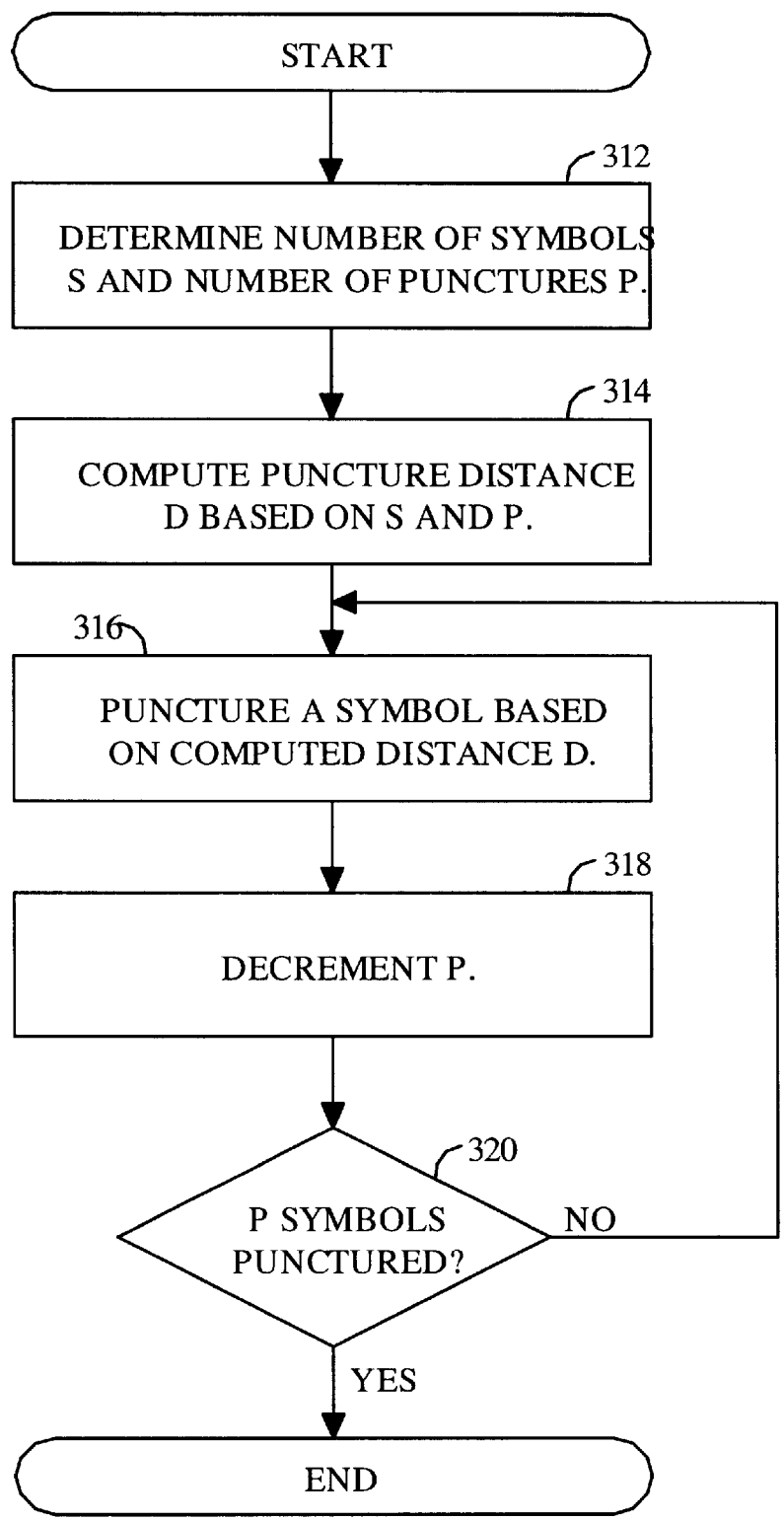
FIG. 3A is a flow diagram of a conventional symbol puncturing technique, which is described in the CDMA-2000 standard.

FIG. 3A is a flow diagram of a conventional symbol puncturing technique, which is described in the CDMA-2000 standard. Initially, the number of generated code symbols S and the number of required punctures P for a particular frame are determined, at step 312. Referring back to FIG. 2, S code symbols are generated by symbol repeater 216 for a particular frame. If the frame has a capacity of N symbols and if S≧N, then P symbols are punctured, where P=S−N. If P is equal to zero then puncturing is not required. Otherwise, a puncture distance D is computed, at step 314, based on the determined number of symbols S and the number of punctures P. The puncture distance is the number of symbols between two consecutive puncture symbols, plus 1, wherein the first puncture occurs at the $D^{th}$ symbol in the frame. For example, if D=3, then there would be two unpunctured symbols before the next puncture. In accordance with the CDMA-2000 standard, the puncture distance D is computed as:

$$D = \left\lfloor \frac{S}{P} \right\rfloor, \quad \text{Eq (1)}$$

where the symbol "⌊ ⌋" denotes the floor operator, which provides the next lower integer. For example, if S/P=5.2, then ⌊S/P⌋=5.

Symbols in the frame are then punctured using the computed distance D. To perform a symbol puncture, symbols in the frame are counted, starting with the first symbol, and the $D^{th}$ symbol is punctured, at step 316. After a symbol has been punctured, the number of required punctures P is decremented, at step 318. A determination is then made whether all P symbols have been punctured, at step 320. This determination can be made by simply checking whether P=0. If all P symbols have been punctured, the process terminates. Otherwise, the process returns to step 316 and another symbol is punctured, again based on the previously computed distance D.

The conventional symbol puncturing technique described in FIG. 3A can provide varied punctured results, depending on the particular values of S and P. Specifically, the punctured symbols may be evenly distributed throughout the frame for some values of S and P, or may be concentrated in one portion of the frame for some other values of S and P. These varied punctured results can be illustrated by the following simple examples.

Figure 3B:
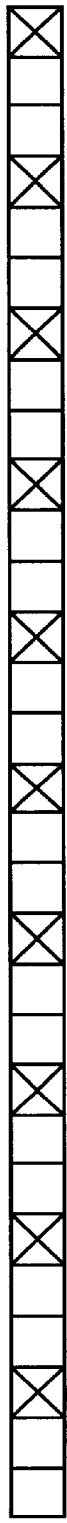
FIGS. 3B–C are diagrams that show two simple puncturing examples using the conventional symbol puncturing technique described in FIG. 3A.

FIG. 3B is a diagram that illustrates a simple example using the conventional symbol puncturing technique described in FIG. 3A. In this specific example, 30 symbols are generated (i.e., S=30) but (for this example) only 20 symbols can be fitted into a frame (i.e., N=20). Thus, 10 symbols need to be punctured (i.e., P=S−N=30−20=10). Using equation (1), the puncture distance D can be computed as 3. As shown in FIG. 3B, every $3^{rd}$ symbol is punctured, as represented by the boxes with the X. In this specific example, the punctured symbols are uniformly distributed across the entire frame.

Figure 3C:

FIG. 3C is a diagram that illustrates another simple example using the conventional symbol puncturing technique, but for different values of S and P. In this specific example, 31 symbols are generated (i.e., S=31) and 20 symbols may be fitted into a frame (i.e., N=20). Thus, 11 symbols need to be punctured (i.e., P=11). Using equation (1), the puncture distance D can be computed as 2. As shown in FIG. 3C, every $2^{nd}$ symbol is punctured, as represented by the boxes with the X, until all 11 symbols have been punctured. After the $11^{th}$ symbol has been punctured, the remaining symbols are passed unmodified. As shown in this specific example, the punctured symbols are concentrated toward the front portion of the frame, while the back portion of the frame is left unchanged. The uneven distribution of punctured symbols results from puncturing the symbols with a high puncture rate (i.e., a short puncture distance D).

FIGS. 3B and 3C illustrate the varied punctured results that can be obtained using the conventional puncturing technique. The puncturing pattern changes from a uniform distribution in FIG. 3B to an uneven distribution in FIG. 3C as a result of simply increasing the number of code symbols S by one. The conventional puncturing technique thus has "critical" points in which, because of the discrete floor operator ⌊ ⌋ the puncturing distance D changes by one whole unit when S is increased by one.

The uneven distribution of the punctured symbols in FIG. 3C can result in performance degradation at the receiver unit. Deletion of symbols is equivalent to reducing the transmit power for those symbols to zero. For convolutionally coded data, a Viterbi decoder is used at the receiver unit to decode the symbols. The Viterbi decoder provides improved performance (i.e., better error correcting capability) if code symbols received in error are more uniformly spread across an entire frame. By puncturing more symbols in one portion of a frame, the Viterbi decoder may not be able to correct symbol errors in that portion of the frame, and an entire frame may be declared erased (i.e., received in error).

Figure 4B:
FIG. 4B is a diagram that shows a puncturing example using the symbol puncturing technique described in FIG. 4A.
Figure 4A:
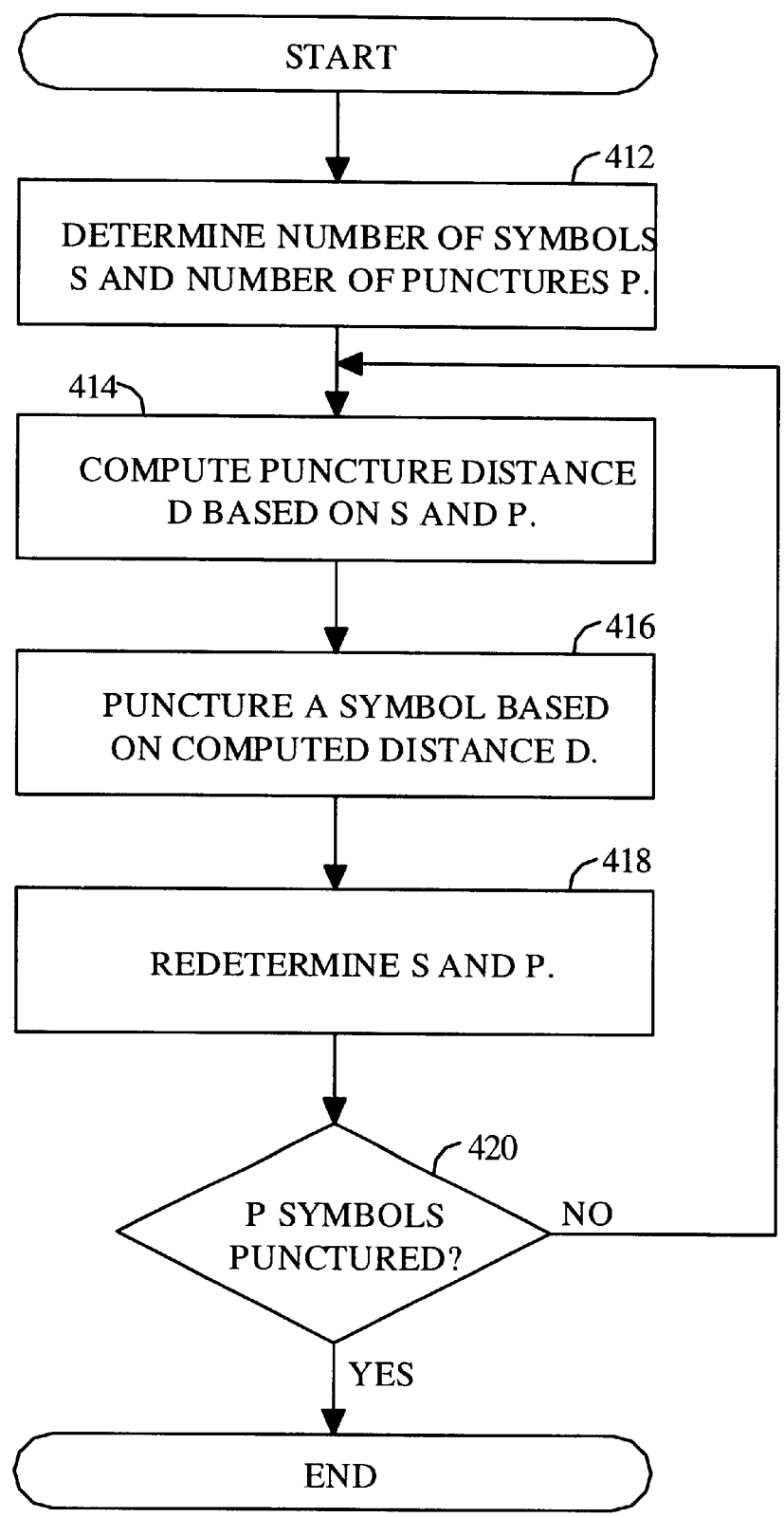
FIG. 4A is a flow diagram of an embodiment of a symbol puncturing technique.

FIG. 4A is a flow diagram of an embodiment of a symbol puncturing technique in accordance with one embodiment. Initially, the number of generated code symbols S and the number of required punctures P for a particular frame are determined, at step 412. If the frame has a capacity of N symbols and if S≧N, then P symbols are punctured, where P=S−N. If P is equal to zero then puncturing is not required. Otherwise, the puncture distance D is computed based on the determined number of symbols S and the number of punctures P, at step 414. The puncture distance D can be computed using equation (1).

Symbols in the frame are then punctured using the computed distance D. To perform a symbol puncture, symbols in the frame are counted, initially starting with the first symbol, and the $D^{th}$ symbol is punctured, at step 416. After a symbol has been punctured, the number of remaining symbols is determined (i.e., $S_{n+1}=S_n-D$) and the number of required punctures P is decremented (i.e., $P_{n+1}=P_n-1$), at step 418. A determination is then made whether all P symbols have been punctured, at step 420. Again, this determination can be made by simply checking whether P=0. If all P symbols have been punctured, the process terminates. Otherwise, the process returns to step 414 and the puncture distance D is recomputed based on the updated values for S and P. Symbols are counted from there onwards and the $D^{th}$ symbol is punctured, at step 416. The process then continues until all P symbols have been punctured.

The symbol puncturing technique shown in FIG. 4A recomputes the puncture rate (i.e., the puncture distance D) in "real-time" after each puncture. The new "puncture distance" (i.e., the number of symbols until the next puncture) is computed based on the number of symbols still remaining and the number of punctures still to be performed. Each computation generates a new puncture distance D that attempts to uniformly distribute the remaining symbol punctures.

For a clearer understanding, the puncturing technique described in FIG. 4A can be applied to the example shown in FIG. 3C in which 31 code symbols are generated (i.e., S=31) and the frame has a capacity of 20 symbols (i.e., N=20). Again, 11 symbol punctures are required. Table 1 lists the parameters S, P, and D for each puncture (i.e., for each pass through the loop shown in FIG. 4A).

TABLE 1

| Parameters | S | P | D |
| --- | --- | --- | --- |
| Start | 31 | 11 | D = [31/11] = 2 |
| After 1st puncture | 29 | 10 | D = [29/10] = 2 |
| After 2nd puncture | 27 | 9 | D = [27/9] = 3 |
| After 3rd puncture | 24 | 8 | D = [24/8] = 3 |
| After 4th puncture | 21 | 7 | D = [21/7] = 3 |
| After 5th puncture | 18 | 6 | D = [18/6] = 3 |
| After 6th puncture | 15 | 5 | D = [15/5] = 3 |
| After 7th puncture | 12 | 4 | D = [12/4] = 3 |
| After 8th puncture | 9 | 3 | D = [9/3] = 3 |
| After 9th puncture | 6 | 2 | D = [6/2] = 3 |
| After 10th puncture | 3 | 1 | D = [3/1] = 3 |

FIG. 4B is a diagram that shows the results of the puncturing example described in Table 1. For the first two punctures, the distance is computed as two (i.e., D=2). After the second symbol puncture, the remaining symbols are punctured with a distance of three (i.e., D=3). When comparing the puncture pattern shown in FIG. 4B versus the puncture pattern shown in FIG. 3C, it can be observed that the symbol puncturing technique of the invention provides a much more even distribution of punctured symbols.

Figure 5B:
FIG. 5B is a diagram that shows a puncturing example using the symbol puncturing technique described in FIG. 5A.
Figure 5A:
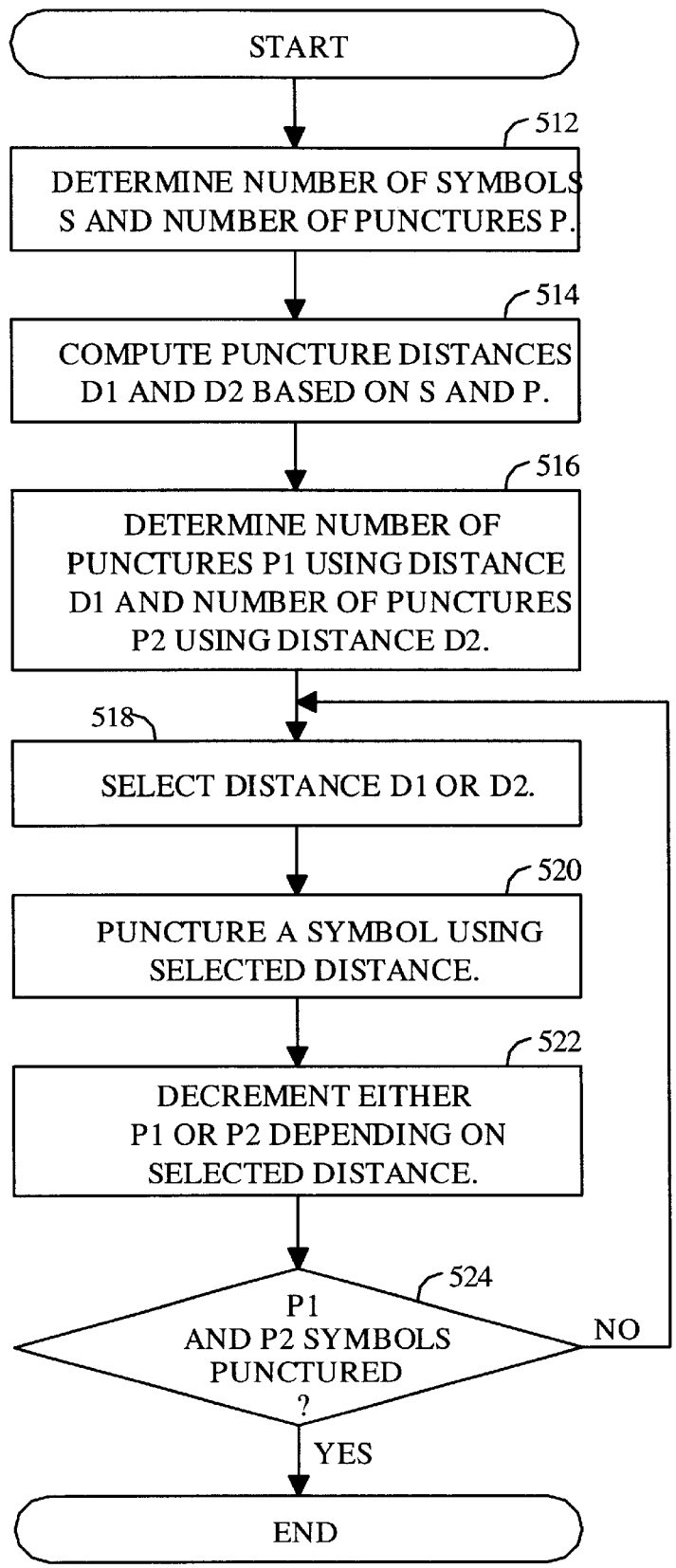
FIG. 5A is a flow diagram of an embodiment of another symbol puncturing technique.

FIG. 5A is a flow diagram illustrating another symbol puncturing technique in accordance with one embodiment. Initially, the number of generated code symbols S and the number of required punctures P for a particular frame are determined, at step 512. Again, if the frame has a capacity of N symbols and if $S \geq N$, then P symbols are punctured, where P=S−N. If P is equal to zero then puncturing is not required. Otherwise, two puncture distances D1 and D2 are computed, at step 514, based on the determined number of symbols S and the number of punctures P.

For every integer S and P, the following equality can be shown to be true:

$$P \left\lfloor \frac{S}{P} \right\rfloor \leq S \leq P \left\lceil \frac{S}{P} \right\rceil. \quad \text{Eq (2)}$$

Based on equation (2), two puncture distances D1 and D2 can be computed as:

$$D1 = \left\lfloor \frac{S}{P} \right\rfloor, \text{ and} \quad \text{Eq (3)}$$

$$D2 = \begin{cases} D1 & \text{if } D1*P = S \\ D1+1 & \text{otherwise.} \end{cases} \quad \text{Eq (4)}$$

From equations (3) and (4), D1 can be computed with one division operation and D2 can be computed as D1+1. However, other values for D1 and D2 can also be selected and are within the scope of the invention. For example, D1 can be chosen to equal $\lfloor S/P \rfloor$ and D2 can be chosen to equal $\lceil S/P \rceil$.

The number of punctures P1 using puncture distance D1 and the number of punctures P2 using puncture distance D2 are then computed, at step 516. The number of punctures P1 and P2 can be computed as:

$$P2 = S - P*D1, \text{ and} \quad \text{Eq (5)}$$

$$P1 = P - P2. \quad \text{Eq (6)}$$

The puncture distances D1 and D2 and the number of punctures P1 and P2 are related by the following:

$$S = P1 \cdot D1 + P2 \cdot D2 \quad \text{Eq (7)}$$

Once the puncture distances D1 and D2 and the number of punctures P1 and P2 have been computed, one of the computed puncture distances is selected, at step 518. Various methods can be used to select either D1 or D2, as described below. A symbol in the frame is then punctured using the selected puncture distance. Again, to perform a symbol puncture, symbols in the frame are counted, starting with first symbol in the frame or the last punctured symbol, and the $D1^{th}$ or $D2^{th}$ symbol is punctured, at step 520. After a symbol has been punctured, the required number of punctures P1 or P2 is decremented, depending on which puncture distance has been selected, at step 522. Specifically, P1 is decremented if D1 is selected and P2 is decremented if D2 is selected.

A determination is then made whether all P1 and P2 symbols have been punctured, at step 524. This determination can be made by simply checking whether P1=0 and P2=0. If all P1 and P2 symbols have been punctured, the process terminates. Otherwise, the process returns to step 518 and one of the puncture distances is selected. The process then continues until all P1 and P2 symbols have been punctured.

For a better understanding, the puncturing technique described in FIG. 5A can be applied to the specific example described above in which 31 symbols are generated (i.e., S=31), 20 symbols may be fitted into a frame (i.e., N=20), and 11 symbols need to be punctured (i.e., P=11). Using equations (3) and (4), the puncture distances D1 and D2 can be computed as:

$$D1 = \lfloor 31/11 \rfloor = 2, \text{ and}$$

$$D2 = \lceil 31/11 \rceil = 3,$$

respectively. Using equations (5) and (6), the number of punctures at distances D2 and D1 can be computed as:

$$P2 = 31 - 11 \lfloor 31/11 \rfloor = 9, \text{ and}$$

$$P1 = 11 - 9 = 2,$$

respectively. Thus, two punctures are performed at the distance of two and nine punctures are performed at the distance of three.

As noted above, various methods can be used to select which one of the puncture distances, D1 or D2, to use for the next puncture. In one embodiment, one of the puncture distances (e.g., D1) is selected and used for a corresponding number of times (e.g., P1) and then the other puncture distance (e.g., D2) is selected and used for the remaining punctures (e.g., P2). For the above example, two punctures (P1) can be performed at the distance of two (D1) followed by nine punctures (P2) at the distance of three (D2).

In another embodiment, the puncture distances D1 and D2 are alternately selected and used until all punctures at one of the distances are achieved. The remaining punctures are then performed using the other distance. For the above example, the punctures can be performed using the distances of 2, 3, 2, 3, 3, 3, and so on.

In yet another embodiment, the P1 punctures at the distance of D1 are approximately distributed among the P2 punctures at the distance of D2. For example, if the ratio of P1 to P2 is R, then R punctures are performed using the distance D1 for each puncture using the distance D2. For the above example, two punctures are performed using the distance of two and nine punctures are performed using the distance of three. Thus, four or five punctures can be performed using the distance of three for each puncture at the distance of two.

In yet another embodiment, a weighting algorithm can be used to distribute the P1 punctures at the distance of D1 among the P2 punctures at the distance of D2. Let intermediate value F=P1*N2−P2*N1, wherein N1 and N2 are incremental counters indicating the number of punctures at an iterative round. The maximum values for N1 and N2 are chosen so that the puncturing distances D1 and D2 are distributed within the frame. At the beginning of every frame and after every puncture, and while N1+N2<P, the distance D2 is chosen and N2 is incremented by 1 if F<0, otherwise the distance D1 is chosen and N1 is incremented by 1.

In yet another embodiment, the symbol punctures are (approximately) uniformly distributed over the entire frame. In one specific implementation of this embodiment, a "wrap-around" accumulator can be used to store a value that is then used to select the puncture distance for the next puncture. The accumulator is designed to store a value ranging from zero to B, where B is typically a power of twos (e.g., 256, 512, 1024, or some other value). B may also be selected to be larger than or equal to the size of the frame (i.e., B≧N). Initially, the smaller value of the punctures P1 and P2 is determined. Then an accumulation value A is computed as the ratio of the smaller P1 or P2 value to the larger P1 or P2 value, multiplied by the value B. For example, if P1=2, P2=9, and B=1024, then A=(P1/P2)·B=(2/9)·1024≅227. Thereafter, before each puncture, the accumulation value A is added to the value in the accumulator and stored back to the accumulator. If the accumulator wraps around after the accumulation with the value A, then the puncture distance corresponding to the smaller P1 or P2 value is selected for the next symbol puncture.

For the above example, the values in the accumulator can be computed as 227, 454, 681, 908, 111, 338, 565, 792, 1019, 222, and 449, before the $1^{st}$, $2^{nd}$, $3^{rd}$, $4^{th}$, $5^{th}$, $6^{th}$, $7^{th}$, $8^{th}$, $9^{th}$, $10^{th}$, and $11^{th}$ symbol punctures, respectively. The puncture distance D1 is selected for the $5^{th}$ and $10^{th}$ symbol punctures since the accumulator has wrapped around and has values of 111 and 222, respectively. By initializing the accumulator with a value other than zero, the first puncture at the distance of two can be different. For example, if the accumulator is initialized a the value of 512, then the $3^{rd}$ and $7^{th}$ punctures are performed at the distance of two and the remaining punctures are performed at the distance of three.

For the embodiment shown in FIG. 5A, the computational costs are maintained low. Specifically, only one division operation is performed at step 514 to compute the puncture distances D1 and D2, which is the same number of division operation as for the conventional puncturing technique shown in FIG. 3A. Thus, the embodiment shown in FIG. 5A provides improved performance at equivalent computation costs.

FIG. 5B is a diagram that shows the results of the puncturing example described above using the symbol puncturing technique shown in FIG. 5A. In this diagram, the $1^{st}$ and $6^{th}$ punctures are performed using the distance of two and the other punctures are performed using the distance of three. The punctures at distances D1 and D2 can also be distributed in various other manners, some of which are described above.

The symbol puncturing technique described in FIG. 5A can be generalized to cover N puncture distances. The N puncture distances D1 through DN can be computed based on S and P (and possibly other parameters) and used to puncture S code symbols. For improved puncturing results (e.g., a more even distribution of the symbol punctures), each of the distances D1 through DN can be selected to be greater than or equal to a minimum puncture distance Dmin defined as:

$$D\min = \left\lfloor \frac{S}{P} \right\rfloor. \quad \text{Eq (8)}$$

However, deviations from the above condition can be made and are within the scope of the present invention.

For the N puncture distances, the number of symbol punctures to be performed at each of the puncture distances D1 through DN is then determined. The P1 through PN symbol punctures at the distances of D1 through DN, respectively, are selected such that the following conditions are satisfied:

$$P = \sum_{n=1}^{N} Px, \text{ and} \quad \text{Eq (9)}$$

$$S = \sum_{x=1}^{N} Px \cdot Dx. \quad \text{Eq (10)}$$

P1 through PN symbol punctures are then performed at the distances of D1 through DN, respectively.

As noted above, a complementary process is performed at the receiver unit to account for the symbol puncturing performed at the transmitter unit. Specifically, erasures (i.e., "don't knows") are inserted in place of symbols that have been punctured. The erasures are given appropriate weighting during the subsequent decoding process.

Prior to the decoding, N code symbols are received for a particular frame. The number of symbol punctures P that had been performed among S code symbols to generate the N received symbols are then determined. A number of puncture distances, D1 through DN, is then computed based on S and P. P1 through PN symbol punctures that had been performed at the distances of D1 through DN, respectively, are also determined. A puncturing pattern used to puncture the S symbols to generate the N received symbols is then derived based on the P1 through PN symbol punctures at the distances of D1 through DN, respectively. P erasures are then inserted among the N received symbols based on the derived puncturing pattern to generate S recovered symbols, which are then decoded with a particular decoding scheme. Again, for a more even distribution of the erasures/symbol punctures, each of the distances D1 through DN can be selected to be greater than or equal to a minimum puncture distance Dmin defined above.

As a simple example, for the embodiment in which P1 symbol punctures at the distance of D1 are performed followed by P2 symbol punctures at the distance of D2, the receiver unit inserts P1 erasures, one after each $D1^{th}$ received symbols, then inserts P2 erasures, one after each $D2^{th}$ received symbols. The S recovered symbols are then decoded with a particular decoding scheme complementary to the coding scheme used at the transmitter unit.

Figure 6:
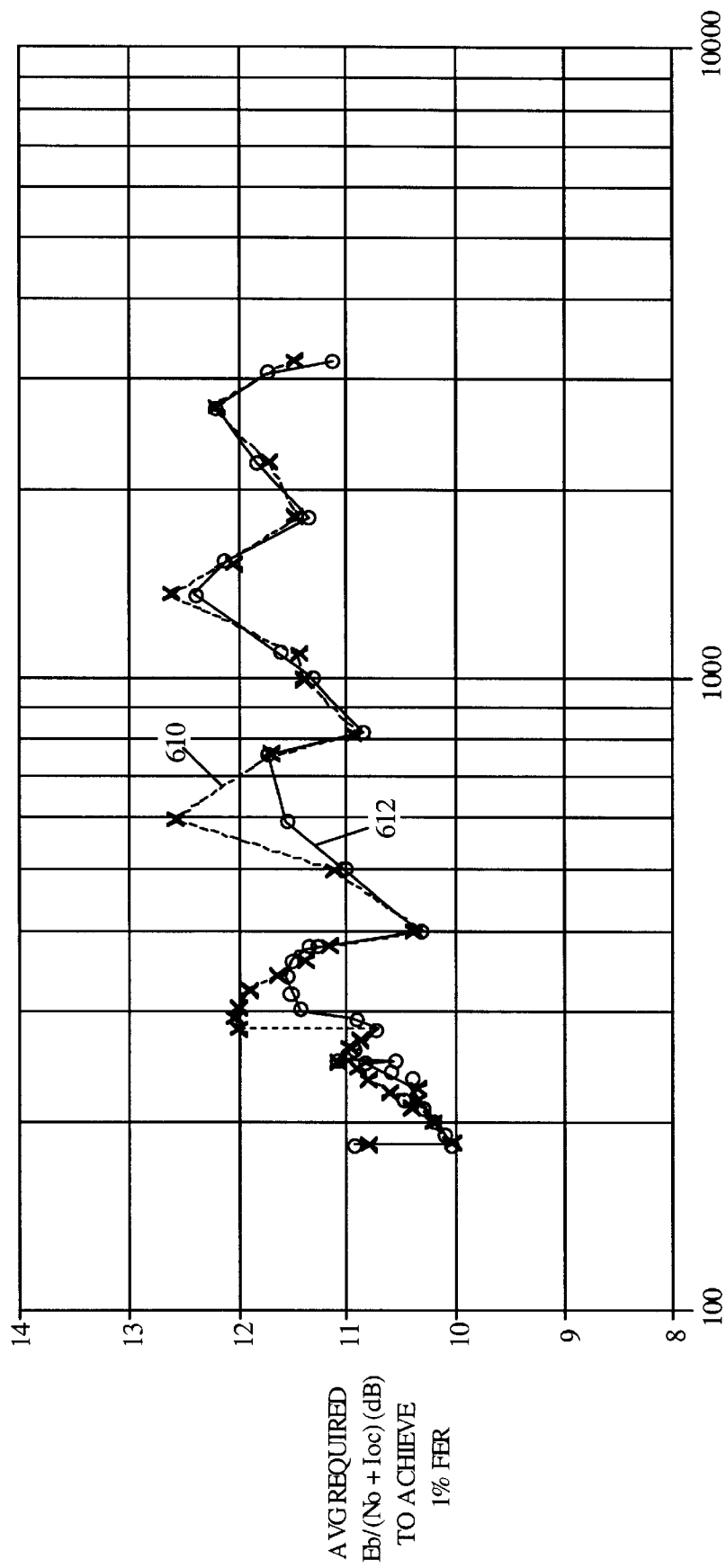
FIG. 6 shows plots of the performance achieved with a conventional puncturing technique versus the performance achieved with a puncturing technique in accordance with one embodiment.

FIG. 6 shows plots of the performance achieved with the conventional puncturing technique described in FIG. 3A versus the performance achieved with a puncturing technique in accordance with one embodiment. The performance results are for the forward link (i.e., from a base station to a user terminal) in the CDMA-2000 system. The horizontal axis represents the number of data and CRC bits for each frame. For the CDMA-2000 system, frames of various sizes are available for use, with the frame sizes being an integer multiple of a basic frame size (e.g., available frame sizes are 768·K, where K=1, 2, . . . ). The vertical axis represents the average required energy-per-bit-to-total-noise-plus-interference Eb/(No+Ioc) for a frame error rate (FER) of 1%.

The simulation results for the conventional puncturing technique are shown by a dashed line 610 in FIG. 6. The results indicate some peaks at approximately periodic intervals. For example, peaks are observed at approximately 300, 600, 1200, and 2400 bits. These peaks result from the uneven symbol puncturing generated by the conventional puncturing technique. The peaks represent the need for a higher average energy per bit Eb to maintain the same FER of 1%.

The simulation results for the puncturing technique in accordance with one embodiment are shown by a solid line 612 in FIG. 6. The results indicate improvement in performance at some of the peaks. In particular, improvements of approximately 0.5 dB and 1.0 dB are observed at 300 and 600 bits, respectively.

In one embodiment puncturing may be advantageously performed without using numbers of symbol punctures P1 and P2 or puncture distances D1 and D2. An accumulator is configured to wrap around after it has been incremented to a value that is greater than or equal to S, each increment being of size P, wherein P is a desired number of symbol punctures, S is a total number of received symbols, and N is a frame capacity in symbols (i.e., a number of symbols remaining after puncturing). The accumulator is thus a modulo-S accumulator. A symbol index is advantageously initialized to one. The symbol index is incremented by one each time the accumulator is incremented by P, until the symbol index reaches the value S. The process is advantageously begun with a puncture. Each time the accumulator wraps around, a puncture is performed. Nevertheless, one of ordinary skill in the art would readily appreciate that the process need not be initiated with a puncture. Additionally, while the accumulator is advantageously initialized to S, those of skill would understand that the accumulator may be initialized to any value, such as, e.g., zero. Moreover, those of skill would appreciate that the process may instead be run in reverse, so that the symbol index is initially set to the value S, and decremented by one each time the accumulator is incremented by P, until the symbol index reaches one.

In an example of the just-described embodiment, ten symbols are received and the frame capacity is only seven symbols, so three symbols must be punctured. Accordingly, P is 3, N is seven, and S is ten. The values for the accumulator and the symbol index are shown Table 2 below.

TABLE 2

| Accumulator Value (Initialized to 10) | Symbol Index (Initialized to 1) |
| --- | --- |
| 0 (10-10) | PUNCTURE (X) |
| 3 | 2 |
| 6 | 3 |
| 9 | 4 |
| 2 (12-10) | PUNCTURE (X) |
| 5 | 6 |
| 8 | 7 |
| 1 (11-10) | PUNCTURE (X) |
| 4 | 9 |
| 7 | 10 |
| 0 | STOP |

Figure 7:
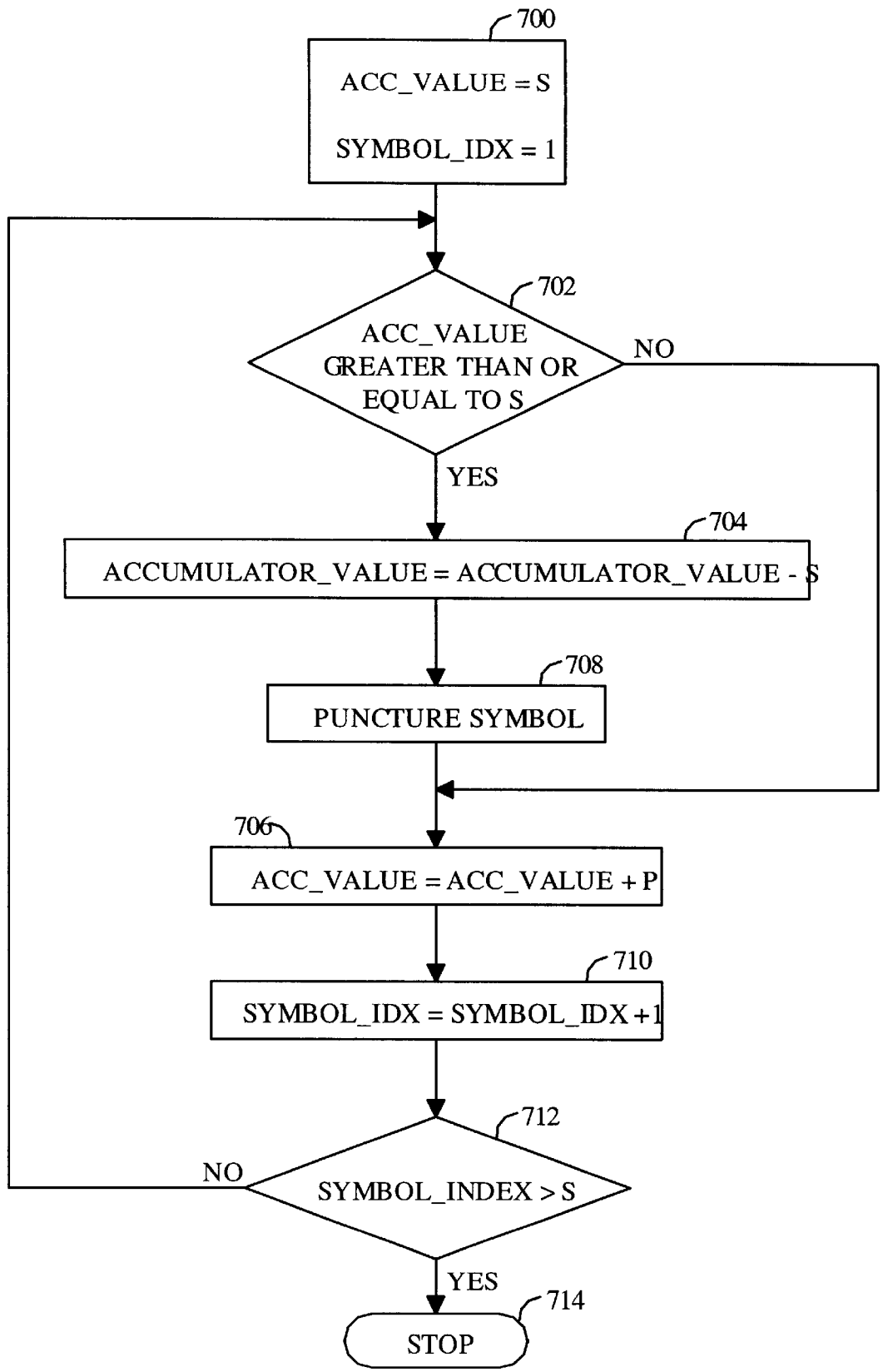
FIG. 7 is a flowchart illustrating an alternative method of puncturing symbols.

A flowchart illustrating algorithm steps in accordance with the just-described embodiment is shown in FIG. 7. In step 700 a field denoted ACC_VALUE is initialized to the value S, and a field denoted SYMBOL_IDX is initialized to one. In other embodiments ACC_VALUE is initialized to values other than S, such as, e.g., zero. Control flow then proceeds to step 702. In step 702 ACC_VALUE is compared with the number S. If ACC_VALUE is greater than or equal to S, control flow proceeds to step 704. If, on the other hand, ACC_VALUE is not greater than or equal to S, control flow proceeds to step 706. In step 704 ACC_VALUE is decremented by S (i.e., ACC_VALUE is set equal to the difference between ACC_VALUE and S). Control flow then proceeds to step 708. In step 708 a symbol corresponding to the value of SYMBOL_IDX is punctured. Control flow then proceeds to step 706. In step 706 ACC_VALUE is incremented by P (i.e., ACC_VALUE is set equal to the sum of ACC_VALUE and P). Control flow then proceeds to step 710. In step 710 SYMBOL_IDX is incremented by one (i.e., SYMBOL_IDX is set equal to the sum of SYMBOL_IDX and one). Control flow then proceeds to step 714. In step 712 SYMBOL_IDX is compared with the value S. If SYMBOL_IDX is greater than S, control flow proceeds to step 714, at which the process stops. If, on the other hand, SYMBOL_IDX is not greater than S, control flow returns to step 702 and the process continues. In other embodiments SYMBOL_IDX is initialized to the value S and the algorithm terminates when SYMBOL_IDX drops below the one.

In an alternate embodiment, wherein the values S and P have a common denominator M, the value S/M may be substituted for the value S, and the value P/M may be substituted for the value P in the flowchart of FIG. 7 for ACC_VALUE field (but not in the SYMBOL_IDX field). Accordingly, the ACC_VALUE field is initialized to S/M and a modulo-S/M register is used for the accumulator. The accumulator is incremented by P/M each increment. Every time the accumulator value exceeds S/M, a modulo-S/M operation is performed and a symbol puncture is done.

Figure 8:
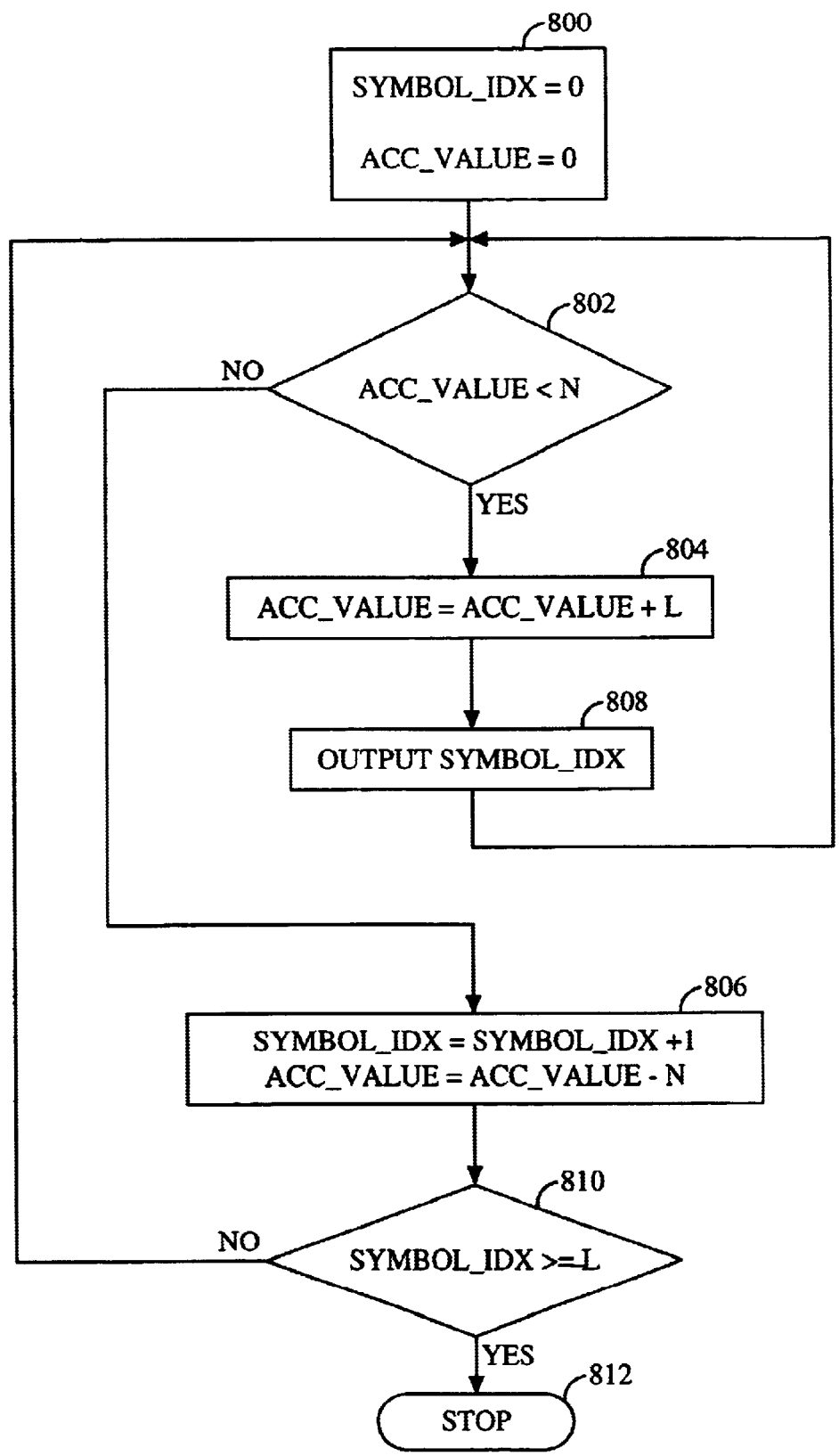
FIG. 8 is a flowchart of illustrating a technique for combined puncturing and repeating of symbols.

In one embodiment symbol puncturing is advantageously combined with symbol repetition as illustrated by the flowchart of FIG. 8. In accordance with this embodiment, N is defined as the number of symbols after repetition and puncturing (i.e., the desired frame length in symbols), and L is defined as the input length before repetition (i.e., the frame size in symbols at the output of the encoder (not shown)). It would be readily appreciated by those of skill in the art that, in the embodiments described above with reference to FIG. 7, S, which is equal to N+P, is also equal to k*L, with k being defined as an integer number of repetitions, and S.

In FIG. 8, in step 800 a symbol index, having a field denoted SYMBOL_IDX, is initialized to zero, and an accumulator, having a field denoted ACC_VALUE, is also initialized to zero. Control flow then proceeds to step 802. In step 802 the algorithm determines whether ACC_VALUE is less than N. If ACC_VALUE is less than N, control flow proceeds to step 804. If, on the other hand, ACC_VALUE is not less than N, control flow proceeds to step 806. In step 804 ACC_VALUE is incremented by L. Control flow then proceeds to step 808. In step 808 the value of SYMBOL_IDX is output. The algorithm then returns to step 802 to perform another iteration. In step 806 SYMBOL_IDX is incremented by one, and ACC_VALUE is decremented by N. Control flow then proceeds to step 810. In step 810 the algorithm determines whether SYMBOL_IDX is greater than or equal to L. If SYMBOL_IDX is greater than or equal to L, control flow proceeds to step 812, and the algorithm stops. If, on the other hand, SYMBOL_IDX is not greater than or equal to L, the algorithm returns to step 802 to perform another iteration.

It would be understood by those of skill that SYMBOL_IDX specifies a symbol position in the frame with length L that is input to combined repeating and puncturing logic (not shown). Each time step 808 is performed (i.e., SYMBOL_IDX is output), the symbol at location SYMBOL_IDX is repeated a number of times in the frame with length N that is generated by the combined repeating and puncturing logic. In a particular embodiment, the symbol is repeated an integer number times equal to the quotient N/L (rounded up or down if N/L is not an integer, the rounding up and down being advantageously alternated each time SYMBOL_IDX is incremented). Those of skill would understand that the output frame of length N may be arranged in other ways without departing from the scope of the present invention.

In accordance with one embodiment, symbol repetition and puncturing is performed according to the following pseudo-code steps:

```
L= size of frame at output of encoder (input buffer)
N= desired frame length (output buffer)
IN_SYM= 0;   #Index to the input buffer
ACC= 0;
while (IN_SYM < L)
    while (ACC < N)
        output symbol IN_SYM
        ACC= ACC+L;
    end while
    IN_SYM= IN_SYM + 1;
    ACC= ACC-N;
end while
```

Those of skill would understand that the techniques described above in pseudo-code and also with reference to the flowchart of FIG. 8 provide a uniform pattern of repetition and/or puncturing without any constraints on input or output lengths, L and N, for the repeating and puncturing logic (not shown). It would be further appreciated by those skilled in the art that a method in accordance with the embodiments illustrated in FIG. 8 and the above-listed pseudo-code may be applied differently (i.e., with different values assigned to N and L for each branch) to each branch of a parallel Turbo coder to achieve unequal repetition and/or puncturing patterns for systematic bits and parity bits. Repeating systematic bits a greater number of times than parity bits are repeated generally improves coder performance.

For clarity, some aspects of the presently disclosed method and apparatus have been described specifically for the forward link in the CDMA-2000 system. However, the presently disclosed method and apparatus can also be used in other communications systems that employ the same, similar, or different puncturing scheme. For example, the presently disclosed method and apparatus can be used to perform puncturing in the W-CDMA system and other CDMA systems. Moreover, the symbol puncturing techniques of the presently disclosed method and apparatus can also be used on the reverse link (i.e., from the user terminal to the base station). The puncturing techniques of the presently disclosed method and apparatus can be modified to be more suited for the specific system or standard in which it is used.

The symbol puncturing techniques of the presently disclosed method and apparatus can be implemented in various manners. For example, the puncturing techniques can be implemented in hardware within one or more application specific integrated circuits (ASICs), digital signal processors (DSPs), programmable logic device (PLD), controllers, micro-controllers, microprocessors, other electronic units designed to perform the functions described herein, or a combination thereof. Alternatively, the puncturing techniques of the presently disclosed method and apparatus can be implemented in software or firmware executed on a processor or controller. The puncturing techniques of the presently disclosed method and apparatus can also be implemented in a combination of hardware and software.

Thus, a novel and improved method and apparatus for combined puncturing and repeating of code symbols in a communications system have been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, or state machine. The software module could reside in RAM memory, flash memory, ROM memory, EPROM memory, EEPROM memory, registers, hard disk, a removable disk, a CD-ROM, or any other form of storage medium known in the art. An exemplary processor is advantageously coupled to the storage medium so as to read information from, and write information to, the storage medium. In the alternative, the storage medium may be integral to the processor. The processor and the storage medium may reside in an ASIC. The ASIC may reside in a telephone. In the alternative, the processor and the storage medium may reside in a telephone. The processor may be implemented as a combination of a DSP and a microprocessor, or as two microprocessors in conjunction with a DSP core, etc.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method for combined repeating and puncturing of symbols in a communications system, the method comprising:

(a) receiving a first number of symbols L to be fitted into a frame having a capacity of N symbols;

(b) initializing to zero an accumulator value and a symbol index value;

(c) while the accumulator value is less than N, increasing the accumulator value by L and repeating in the frame a symbol from a location in the first number of symbols corresponding to the symbol index value;

(d) if the accumulator value is greater than or equal to N, increasing the symbol index value by one and decreasing the accumulator value by N; and (e) repeating (c)–(d) until the symbol index value is greater than or equal to L.

2. A transmit data processor for use in a communications system, comprising:

an encoder operative to encode a plurality of data bits to generate a plurality of code symbols; and combined symbol repeating and puncturing logic coupled to the encoder and configured to
 (a) receive a first number of symbols L to be fitted into a frame having a capacity of N symbols;
 (b) initialize to zero an accumulator value and a symbol index value;
 (c) while the accumulator value is less than N, increase the accumulator value by L and repeat in the frame a symbol from a location in the first number of symbols corresponding to the symbol index value;
 (d) if the accumulator value is greater than or equal to N, increase the symbol index value by one and decrease the accumulator value by N; and
 (e) repeat steps (c)–(d) until the symbol index value is greater than or equal to L.

3. A transmit data processor for use in a communications system, comprising:

a processor; and a storage medium coupled to the processor and containing a set of instructions executable by the processor to
 (a) receive a first number of symbols L to be fitted into a frame having a capacity of N symbols;
 (b) initialize to zero an accumulator value and a symbol index value;
 (c) while the accumulator value is less than N, increase the accumulator value by L and repeat in the frame a symbol from a location in the first number of symbols corresponding to the symbol index value;
 (d) if the accumulator value is greater than or equal to N, increase the symbol index value by one and decrease the accumulator value by N; and
 (e) repeat steps (c)–(d) until the symbol index value is greater than or equal to L.

4. A transmit data processor for use in a communications system, comprising:

means for receiving a first number of symbols L to be fitted into a frame having a capacity of N symbols;

means for initializing to zero an accumulator value and a symbol index value;

means for, while the accumulator value is less than N, increasing the accumulator value by L and repeating in the frame a symbol from a location in the first number of symbols corresponding to the symbol index value;

means for, if the accumulator value is greater than or equal to N, increasing the symbol index value by one and decreasing the accumulator value by N; and means for repeating the steps of increasing of the accumulator value by L, repeating the symbols in the frame, increasing the symbol index value by one, and decreasing the accumulator value by N until the symbol index value is greater than or equal to L.

5. A computer readable media embodying a method for use in a communications system, the method comprising:

receiving a first number of symbols L to be fitted into a frame having a capacity of N symbols;

initializing to zero an accumulator value and a symbol index value;

while the accumulator value is less than N, increasing the accumulator value by L and repeating in the frame a symbol from a location in the first number of symbols corresponding to the symbol index value;

if the accumulator value is greater than or equal to N, increasing the symbol index value by one and decreasing the accumulator value by N; and repeating the steps of increasing of the accumulator value by L, repeating the symbols in the frame, increasing the symbol index value by one, and decreasing the accumulator value by N until the symbol index value is greater than or equal to L.

* * * * *